United States Patent
Schumacher

[15] 3,680,031
[45] July 25, 1972

[54] GROUNDING DEVICE FOR MOUNTING STRAP

[72] Inventor: Walter C. Schumacher, Warwick, R.I.
[73] Assignee: General Electric Company
[22] Filed: April 30, 1971
[21] Appl. No.: 138,986

[52] U.S. Cl. ............................339/14 R, 174/51, 339/133 R
[51] Int. Cl. ..................................................H01r 3/06
[58] Field of Search.................174/51, 53; 339/14 R, 14 L,
339/122 R, 132 R, 133 R, 134, 256 R, 258 R; 24/73
B, 73 MF, 81 B, 81 BM, 84 B, 129 B; 248/215, 301,
493

[56] References Cited

UNITED STATES PATENTS

| 454,111 | 6/1891 | Coupe | 248/493 |
| 1,616,957 | 2/1927 | Honigbaum | 248/301 X |
| 2,586,728 | 2/1952 | Shepard | 24/73 B UX |
| 2,636,458 | 4/1953 | Harris | 24/81 B UX |
| 2,934,590 | 4/1960 | Thompson et al. | 174/53 |
| 3,021,581 | 2/1962 | Cook et al. | 24/73 B |
| 3,185,760 | 5/1965 | Despard | 174/51 UX |

FOREIGN PATENTS OR APPLICATIONS

| 611,817 | 10/1960 | Italy | 24/73 B |

Primary Examiner—Laramie E. Askin
Attorney—Paul E. Rochford, Frank L. Neuhauser, Oscar B. Waddell and Joseph B. Forman

[57] ABSTRACT

Grounding connection between the mounting strap of a wiring device and the metal housing in which the device is mounted by the strap is achieved by means of a spring clip designed for use with the mounting strap to ensure continuity of electrical connection between the strap and metal housing.

1 Claim, 5 Drawing Figures

PATENTED JUL 25 1972 3,680,031
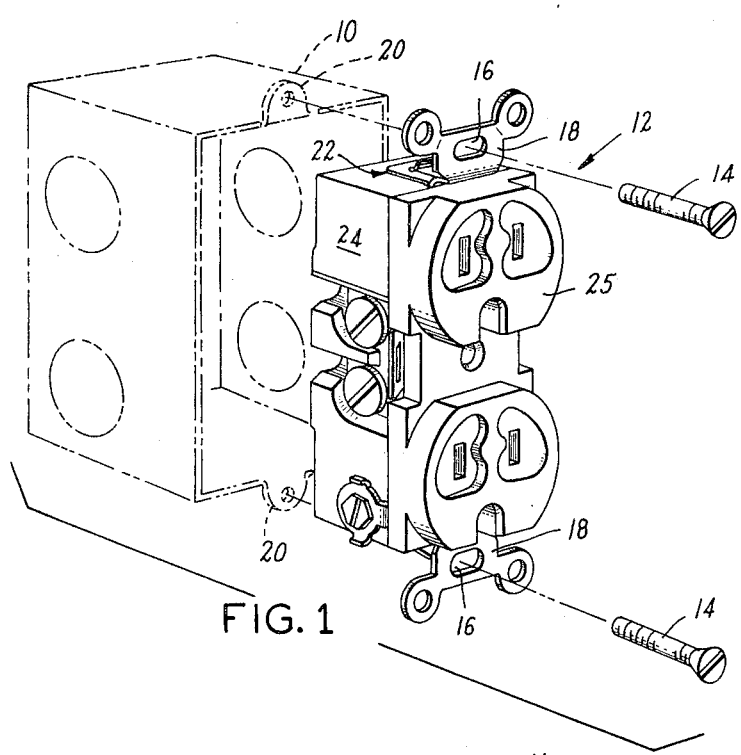
FIG. 1
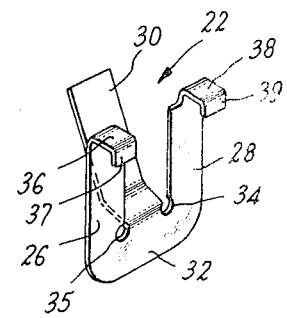
FIG. 2
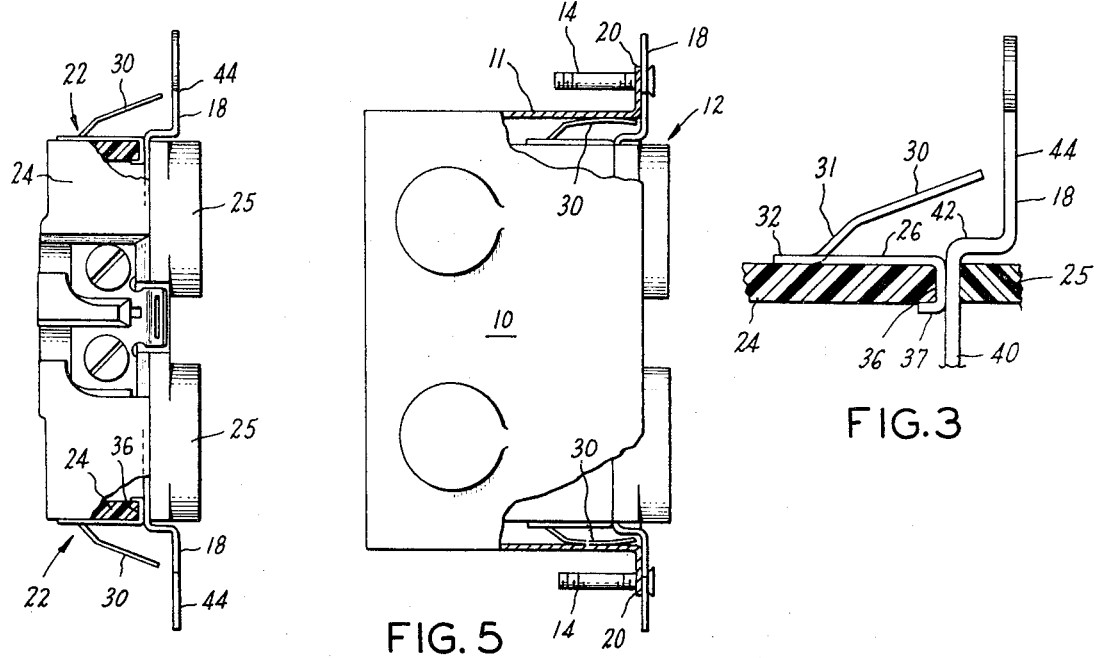
FIG. 3
FIG. 4
FIG. 5
Inventor
Walter C. Schumacher
By Paul E. Rochford
Attorney

GROUNDING DEVICE FOR MOUNTING STRAP

The present invention relates to improved means for grounding connections between mounting strap of wiring devices and the wall boxes into which they are mounted.

Conventionally wiring devices are mounted in metal wall boxes and the like by means of metal screws which extend through openings provided at each end of a mounting strap to receiving threaded openings at the top and bottom or end of a metal wall box into which the wiring device is to be placed. It has been found, after a face plate is mounted on the wiring device and a permanent mounting completed at a wall location, that the mounting screw does not always have the desired contact with the mounting strap or bracket and accordingly that the grounding of the bracket through the screw to the wall box does not necessarily occur. The difficulty may be the result, for example, of the even spacing of the screw in the oversize opening at the end of the mounting bracket due to the realignment of the bracket and the screw supporting it as the face plate is fastened into place. The face plate is conventionally mounted onto the wiring device by means of screws which pass through appropriate holes in the face plate and attach to the mounting strap of the wiring device. A support for the device and its strap relative to the wall box may result as the edges of the face plate press against the wall to minimize the electrical contact between the mounting screw and the bracket.

Normally the mounting strap of a wiring device is formed of steel and where metal conduit or metal sheath enclosed wire is employed the mounting strap is grounded through the metal box and metal sheath or metal conduit. Alternatively, where the cable used has a grounding wire in the cable, connection of this wire directly to the box and grounding strap is performed during installation of the wall box. The problem of obtaining an adequate ground is accentuated where a grounding convenience outlet is to be mounted in a flush mounted metal box. In such case the grounding of the grounding prong of a three prong cap is to be made through the metal strap of the convenience outlet and accordingly must be in turn made through the mounting screw by which the mounting strap is affixed to the wall box.

According to the National Electric Code, Article 250–74, the grounding of grounding type receptacles by grounding the mounting strap to the box with the mounting screws is not acceptable, except when the box in which the device is mounted is itself surface mounted, and except when contact devices or yokes designed and approved for this purpose are employed in an installation which is not surface mounted.

Except in the above cases, the National Electric Code requirement is that an independent connection as by means of a jumper wire or pigtail be made between the terminal screw of the grounding strap and the wall box itself.

Further, according to Article 370–10 of the National Electric Code relating to boxes and fittings, it is required that in a wall or ceiling mounting the outlet box may be set back a maximum of one-quarter inch (¼ inch) from the finished surface of the mounting where the material of the wall or ceiling is a non-combustible material. For combustible materials, the box must be flush or extend beyond the finished surface. The above described mountings of metal boxes to receive wiring devices is the wiring scheme most commonly used and requires separate bonding at the terminal grounding screw of the device to the metal box or the use of an approved contact device or yoke.

It is accordingly one object of the present invention to provide a means for ensuring a grounding connection between a mounting strap and a grounded wiring device receiving box.

Additional objects and advantages of the present invention will be in part pointed out and in part apparent from the description which follows.

In one of its broader aspects the objects of the present invention are achieved by providing a conductive metal strip of spring metal, said strip having a configuration of slits in the metal to give the strip a W configuration of contact fingers, being bent at right angle to the plane of the strip into a hook to clasp an insulating wall, outer fingers of the W, and the center finger being bent out for spring contact with the receiving wall box.

The manner in which the present invention may be carried into effect will be clear from the description which follows taken in conjunction with the accompanying drawings in which:

FIG. 1 is an exploded perspective view of a duplex receptacle equipped with the grounding clip of the present invention.

FIG. 2 is a perspective view of details of a clip as provided pursuant to the present invention.

FIG. 3 is a sectional view of the end of the receptacle showing the clip in place mounted proximate the grounding strap of the receptacle.

FIG. 4 is a less detailed side elevational view, in part in section, of the receptacle as shown in FIG. 3 illustrating a receptacle equipped at each end with the clip of the present invention.

FIG. 5 is a side elevation, partly in section, showing the duplex receptacle equipped with the clip of the present invention in place in a wall box.

Referring now first to FIG. 1 a duplex receptacle 12 is shown positioned for mounting into a wall box 10 shown in phantom. Mounting screws 14 are poised to be threaded in the conventional manner through the screw opening 16 in the receptacle mounting strap 18 and into the threaded tabs 20 formed integrally with the wall box 10 by folding metal into the position shown in FIG. 1. A grounding clip 22 as provided by this invention is shown at the upper portion of duplex outlet 12 mounted behind the mounting strap 18 and disposed against the insulating body 24 of the duplex receptacle 12.

Turning now to FIG. 2 a detailed view of the grounding clip 22 is shown with the clip turned at a 90° angle from the position as shown in FIG. 1. The clip is formed from a flat sheet or strip stock and, as is evident from FIG. 2, has a general W form with three upwardly extending fingers 26, 28, and 30 arising from a common base 32. The two end or outer fingers 26 and 28 are generally in the plane of the strip together with the base 32. The center 30 is bent back out of the plane of the base and end fingers. The center finger 30 may have a lower section such as 31, best seen in FIG. 3, bent at a larger angle, and an upper section bent at a shallower angle to the plane of the end fingers and base of the clip. Strain relief openings 34 and 35 may be provided at the ends of the slits of the W, i.e., the two vertical slits which form the three fingers from the strip. These strain relief openings are disposed so that the movement of the fingers is freer and so that cracking does not develop due to a flexing of finger 30.

The upper ends 36 and 38 of outer fingers 26 and 28 are bent forward from the plane of the fingers 26 and 28 at about right angles to the plane in which the upwardly extending fingers lie. The terminal portions of the forwardly extending end portions 36 and 38 are bent again at right angles to the end sections to form the holding tabs 37 and 39.

Referring now to FIG. 3 the function of the several parts of the tab will be made clearer. The numbering of portions of the grounding clip corresponds to the numbering employed in FIG. 2 so that like numbered parts designate parts described with reference to FIG. 2. Base 32 is seen to be disposed against an insulating wall section 24 of receptacle 12 seen in section in FIG. 3 and 4 and seen as an outer casing surface in FIG. 1. The upwardly extending finger 26 of the clip also lies against the insulating casing. The end section 36 can be seen to be crimped along with bracket 40 between the upper and lower insulating end wall portions 24 and 25 at the end of the receptacle 12. The holding tab 37 is shown extending around and into contact with the inside surface of the insulating wall section 24. Thus the clip is locked by the clamping of its end sections in the insulating housing of receptacle 12 against movement away from the wall section. The mounting strap 40 extends from the interior portion of the housing of receptacle 12 through the conforming opening between wall sections 24 and 25. In its position between these sections it is held in direct grounding contact with end sections 36 and 38 of the grounding clip 22. The portion 42 of the mounting strap extending from the housing of device 12 extends upward with its end portion 44 parallel the portion of the housing.

Referring now to FIG. 4 the position of the grounding clip 22 relative to the larger portion of the receptacle is shown. The numbers used in FIG. 4 correspond to those described with reference to FIGS. 2 and 3 and correspondingly numbered parts have correspondingly described functions.

As illustration of the ultimate use of the receptacle with the clip in place is seen in FIG. 5 wherein the metal box 10 has mounted therein the receptacle 12. The screws 14 extend through the screw holes 16 and threaded screw receptacles 20 of the mounting strap ends 18. The spring arm 30 of the clip is seen to be held in contact with the metal box wall 11.

What is claimed is:

1. A self grounding electrical receptacle
said receptacle having an insulating housing comprising an insulating casing and an insulating cover and a mounting strap sandwiched between the casing and cover,
a grounding clip to ensure grounding of said strap to a wall box
said clip comprising a strip of conductive spring metal,
said strip having two slits extending inward from a common edge to form a W configuration of conductive fingers rising from a common base,
the outer fingers of said W having the ends thereof bent with two right angle bends to form hooks extending in one direction out of the plane of said strip,
the middle finger being bent from its point of attachment to the base in an opposite direction out of the plane of the strip,
said outer fingers being mounted against the casing wall,
and the hooks being sandwiched in grounding contact with said strap between said casing and cover.

* * * * *